Sept. 27, 1932. A. S. JOHNSON ET AL 1,879,285
MACHINE FOR MAKING SHEET METAL ARTICLES
Filed May 18, 1931  5 Sheets-Sheet 1

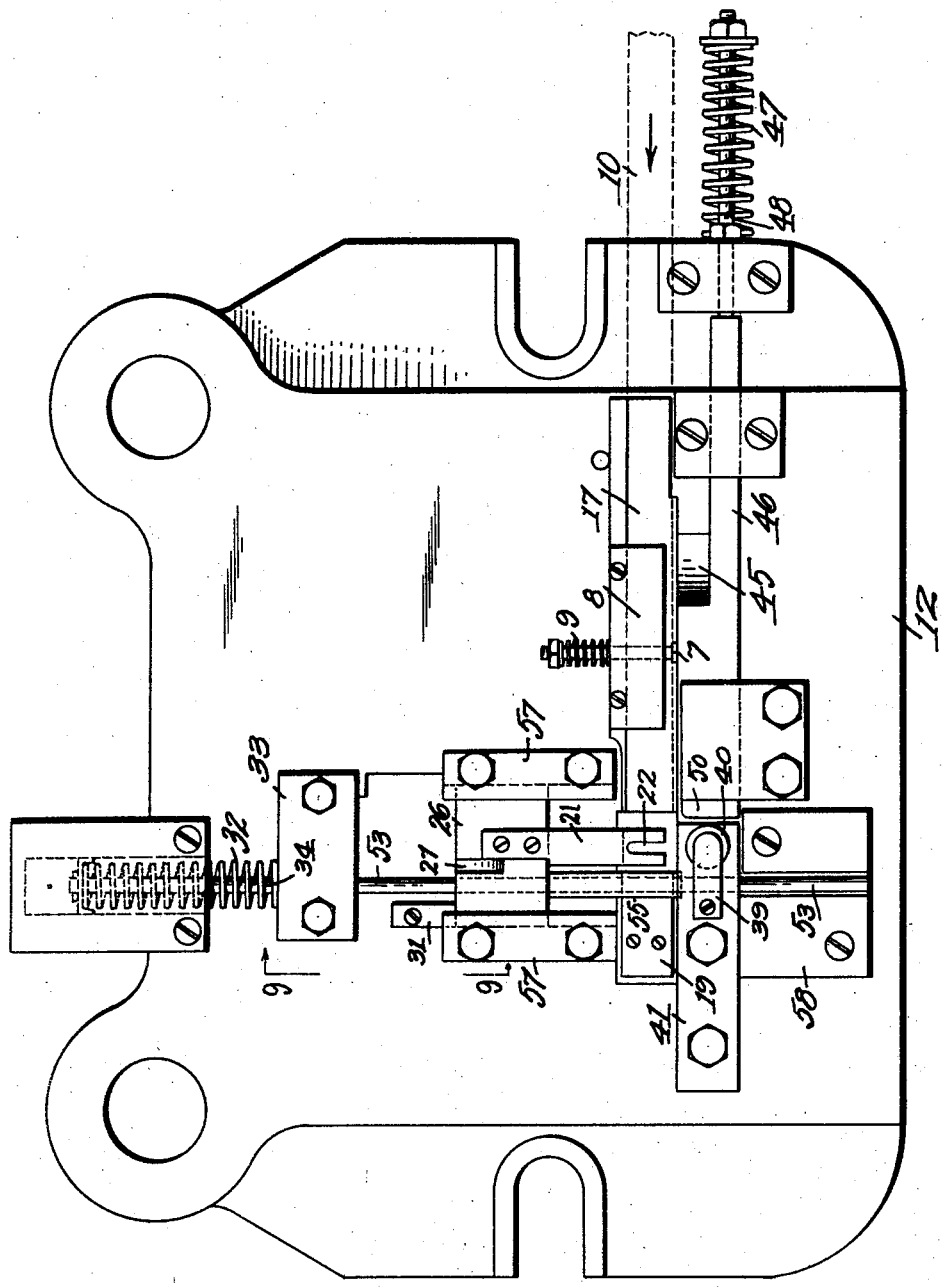

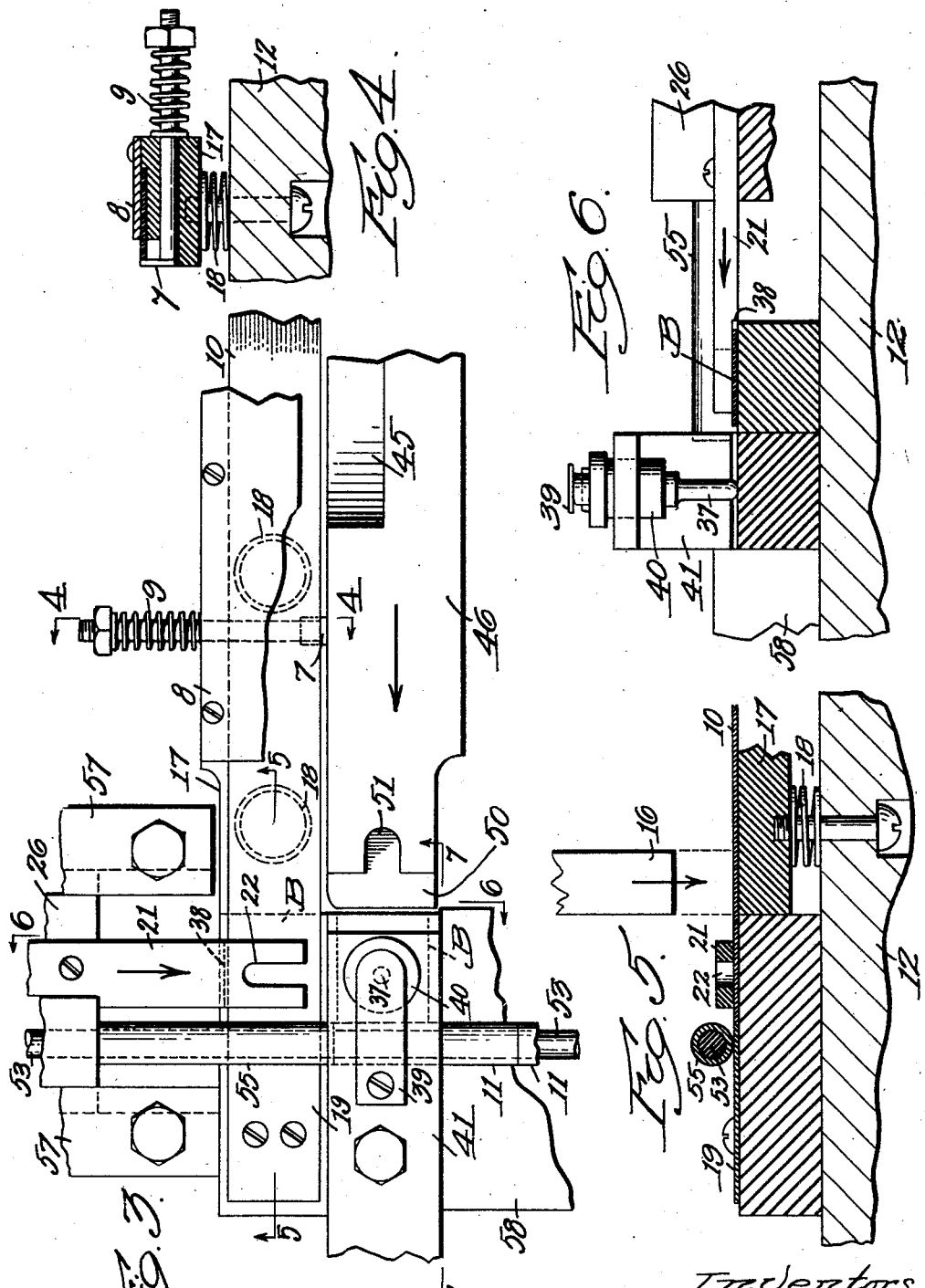

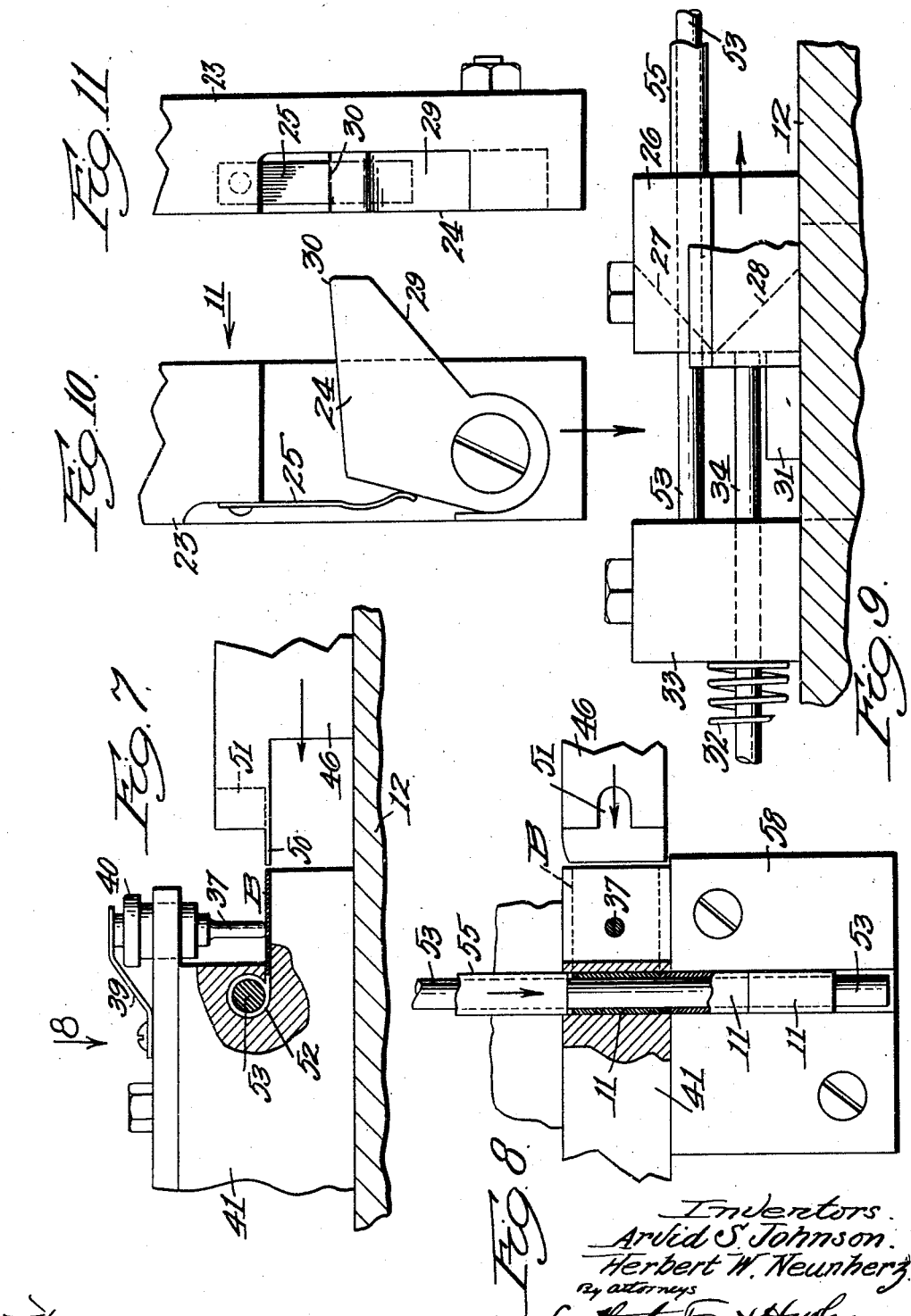

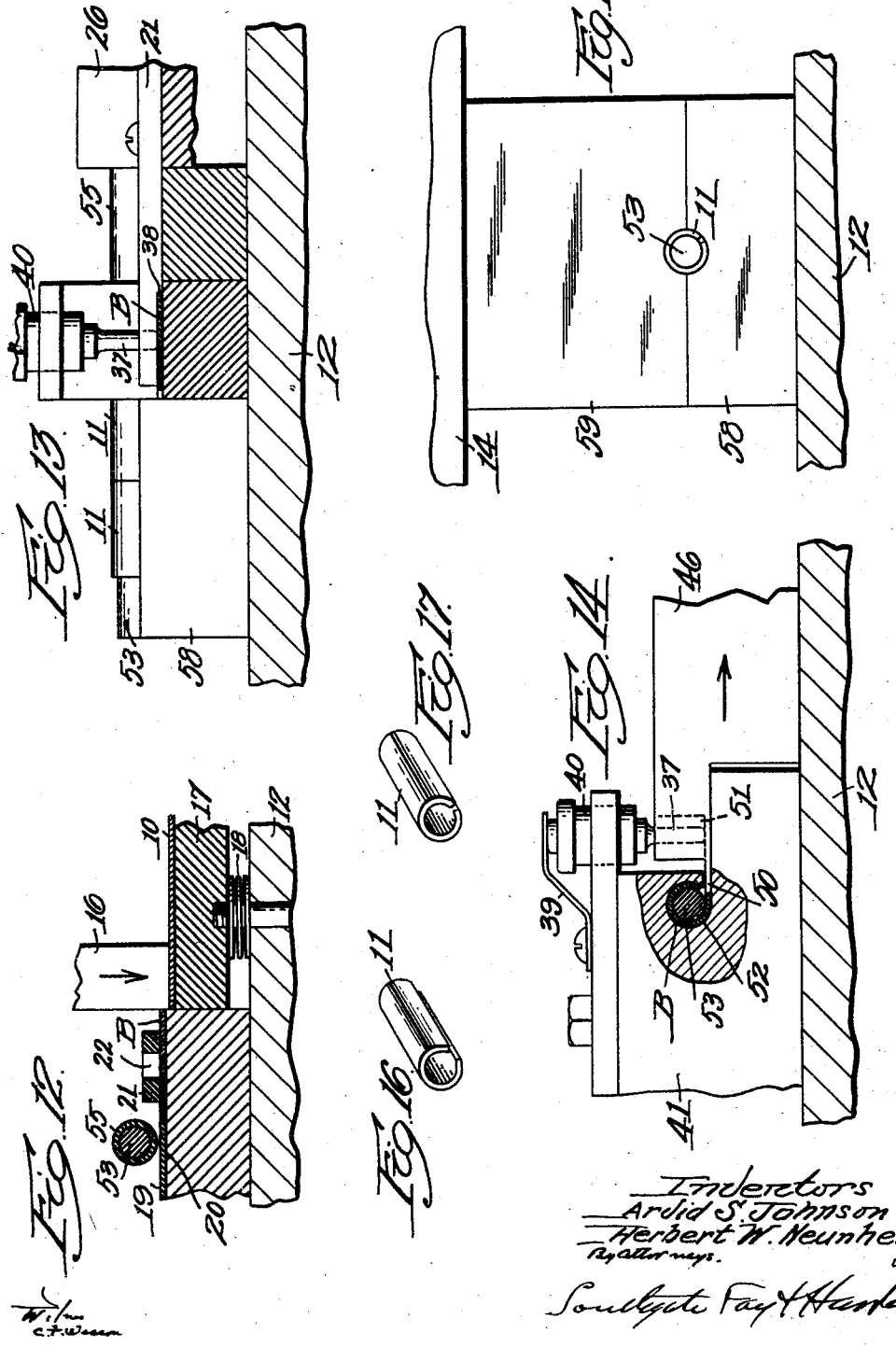

Patented Sept. 27, 1932

1,879,285

UNITED STATES PATENT OFFICE

ARVID S. JOHNSON, OF AUBURN, AND HERBERT W. NEUNHERZ, OF GARDNER, MASSA-
CHUSETTS, ASSIGNORS TO GEM CRIB & CRADLE COMPANY, OF GARDNER, MASSA-
CHUSETTS, A CORPORATION OF MASSACHUSETTS

MACHINE FOR MAKING SHEET METAL ARTICLES

Application filed May 18, 1931. Serial No. 538,076.

This invention relates to a machine capable of general use for making sheet metal articles but particularly adapted for making ferrules or other hollow articles in which there is a seam throughout the length of the article or in which such a seam is not objectionable.

The principal objects of the invention are to provide means for positioning a blank of sheet metal stock in the machine in the proper place, means for cutting off the blank to the proper width, means for rolling the blank up into a substantially cylindrical form and means for then shaping the blank to make sure that the external surface is cylindrical. The invention also involves means whereby all these operations are performed simultaneously on different blanks by a single motion of a reciprocating head. Another object of the invention is to provide an improved die in which the blank is rolled around a mandrel, improved means for ejecting the finished article from the die and mandrel, automatic means for restoring to normal position the slide which moves the stock into the machine and means for restoring all parts to their initial positions, all operated or controlled by the motion of the head back and forth.

Other objects and advantages of the invention will appear hereinafter.

Reference is to be had to the accompanying drawings, in which

Fig. 2 is a plan of the base of the machine with all the parts shown except those attached to the head above;

Fig. 3 is a plan of a portion of the mechanism on enlarged scale;

Fig. 4 is a sectional view on the line 4—4 of Fig. 3;

Fig. 5 is a sectional view on the line 5—5 of Fig. 3;

Fig. 6 is a sectional view on the line 6—6 of Fig. 3;

Fig. 7 is a view showing the die in elevation, but partly in section on the line 7—7 of Fig. 3;

Fig. 8 is a plan of the parts shown in Fig. 7, partly in section;

Fig. 9 is a side view taken as indicated by the arrow 9 in Fig. 2 and showing the means for operating the article ejector;

Fig. 10 is a side view of the plunger which operates this mechanism;

Fig. 11 is an edge view of the same plunger as indicated by the arrow 11 in Fig. 10;

Fig. 12 is a view showing the operation just as the blank is being cut from the original strip of stock;

Fig. 13 is a sectional view showing the completion of the next step in which the blank is shown as held down by a spring plunger;

Fig. 14 is a sectional view similar to Fig. 7 but showing the blank forced into the die into a substantially cylindrical shape;

Fig. 15 is an end elevation showing the descent of the anvil to shape the blank into a more perfect cylindrical form, and Figs. 16 and 17 are perspective views of the article respectively in the conditions indicated in Figs. 14 and 15.

Figure 1:
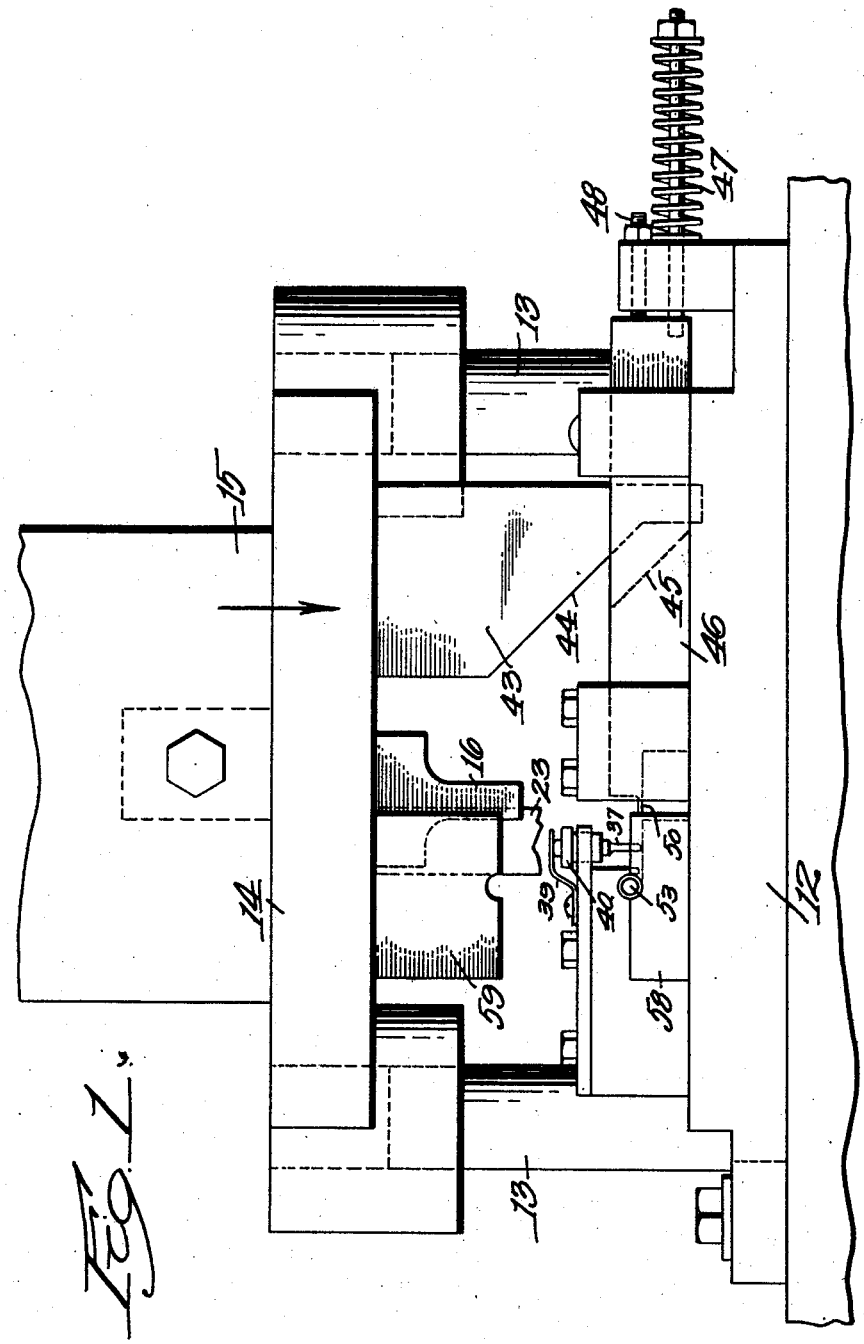
Fig. 1 is a front elevation of a machine constructed in accordance with this invention.

As shown in Fig. 17 the ferrule which is produced by this machine is formed of sheet metal in cylindrical form with a seam or slight separation extending longitudinally along it. In other words it is formed of a flat sheet metal blank bent into cylindrical form and the two edges are in contact substantially but not secured together, at least by this machine. If desired, they can be secured together in any of the known ways. The invention is capable of general use to make articles of sheet metal, particularly hollow articles.

The machine involves a base 12 secured in position and having two or more upright guides 13 for the head 14. This head is mounted on a plunger 15 or the like and reciprocated vertically by any usual machine. It is provided with openings for receiving the guides 13 so that it will work in always exactly the same place. This head is provided with means for accomplishing all of the above mentioned objects or at least controlling their accomplishment.

As shown in Fig. 2 a strip 10 of sheet metal constituting the stock from which the bushings 11 are made is cut to the right width and thickness and fed into the machine by hand from the right in that figure in a recess in a guide plate 17 and against a stop 19. On the guide is a plate 8 forming the top of the recess. On the side is a side register 7 held against the strip 10 by a spring 9.

The guide plate 17 is supported by springs 18 and normally held up in the plane in which the stock is fed into it. When the head 14 descends a cutter 16, rigidly mounted thereon, cuts the projecting end of the stock 10 off to form a blank B. The pressure of the cutter forces down the guide plate 17 against the springs 18. When the cutter ascends the springs force the guide plate and stock up to a position in registration with a horizontal surface 20.

It will be noticed that the blank B or the end of the stock 10 is fed under a plate 21 which is provided with a slot 22 in its end. This is so located as to hold the blank B down against the surface 20 and of course in contact with the stop 19.

On the head 14 is fixed a plunger 23. This plunger has on it a pivoted cam 24 pressed forward to the position shown in Fig. 10 by a spring 25. On the base 12 is a slide 26 movable in guides 57. This slide is provided with two inclined cam surfaces 27 and 28. When the plunger 23 moves down, the cam 24 engages the surface 27, by its inclined surface 29, and is forced back against the spring. When it gets down to the bottom the cam 24 will swing out again and on its rise the corner 30 of this cam will move along the surface 28 of the slide 26 and force that forward from its position against the stop 31. A spring 32 is arranged with one end against a stationary block 33 and connected with a rod 34 which is fixed to the slide 26. Therefore the spring 32 always brings this slide back to the stop and yields to allow the cam to push it forward.

On the slide 26 is the plate 21 which has the notch 22 in its end. The motion of the slide 26 and the plate 21 forces the blank B forward, or laterally with respect to its previous motion, under a plunger 37 as shown in Fig. 13. The plate 21 is recessed at 38 so as just to receive the blank and force it along with it. The notch 22 allows the plate 21 to move in as far as shown in Fig. 13 leaving the plunger 37 pressing on the blank through this notch. This pressure is provided by a spring 39 and the plunger is mounted in a cylinder 40 fixed to a die block 41 fixed on the base 12. This motion of the plate 21 leaves the blank in a position in alignment with certain elements on the block 41.

On the bottom of the head 14 is another cam 43. It has a slanting operating surface 44 which cooperates with a correspondingly slanting surface 45 on a slide 46. Every time the head 14 comes down the operating surface 44 engages the surface 45 and moves the slide to the left in Fig. 1 against the action of a spring 47, which spring draws the slide back when the cam rises. An adjustable stop 48 is provided for limiting the position of the slide.

When the blank moves along to the left a horizontal projection 50 on the slide 46 having a central notch 51 moves first into the position shown in Fig. 7 and then into that shown in Fig. 14. It will be seen that it is in registration with the blank held down by the plunger 37. It continues to move from that position to the position shown in Fig. 14 in which it forces the blank into a die. In doing this the plunger 37 remains in contact with the blank as long as the blank is under it. The plunger is received in the notch 51.

The die into which the blank is forced consists of a substantially cylindrical transverse opening 52 in the die block 41 with a central stationary mandrel 53 therein. The blank is positively forced in between the mandrel and the bottom of the cylindrical opening and has to follow only the course open to it, so it surrounds the mandrel and comes to the position shown in Fig. 14.

The mandrel, as stated, is a stationary rod mounted on the fixed block 33 and extending beyond the end of the tubular article while in this die. It is provided upon it with a slidable sleeve 55 the end of which will engage the article in the die and which substantially fits the die. This sleeve is mounted on the slide 26, operated by the cam 24. It is when the head 14 rises that this slide moves forward and takes with it the sleeve. The sleeve pushes the article sideways out of the die in front and on an anvil 58. This anvil has a semi-cylindrical groove in the top fitting the rolled up article B and the next time the head 14 comes down a companion anvil 59 having a corresponding groove in the bottom comes down on the article, thus left in the groove in the anvil 58 to shape the article to its cylindrical or other desired shape on the mandrel 53. The anvils are shown as being wider than the length of the bushing being made and consequently the anvils will engage the bushing one or more times before the latter is finally pushed out of the lower mandrel by the following bushing. The last operation by the mandrel is for the purpose of shaping the bushing together around the mandrel and bringing it from the shape shown in Fig. 16 to that shown in Fig. 17.

It will be seen from what has been said that one motion of the head 14 down and back performs all of the operations described, of course, performing each one on a different blank. Therefore after the groove in the mandrel is filled with bushings a bushing will be discharged from the machine at each downward motion of the head 14. These operations are all performed automatically by the motion of the head 14 and no attendant has to feed individual blanks into the machine or take out the bushings, the only thing necessary being to supply the piece of sheet metal stock and keep pushing it in as the end is cut off and to either remove the bushings or allow them to fall into a container. The parts are all accurately guided and all restored to normal position as shown after the operation of the various parts has been completed. This constitutes a very accurate and rapid machine for producing these bushings or any other hollow sheet metal object that can be made in this way.

Although we have illustrated and described only one form of the invention we are aware of the fact that many modifications can be made therein by any person skilled in the art without departing from the scope of the invention as expressed in the claims. Therefore we do not wish to be limited in this respect but what we do claim is:—

1. In a machine for making articles of sheet metal, the combination with a base and a head reciprocable toward and from the base, yieldingly mounted means on the base for supporting a strip blank of sheet metal, yielding means on the last-named means for holding the sheet metal in a definite position thereon, a stop against which the forward end of the blank strip will be arrested, a cutter carried by said head for cutting a blank from the end of the sheet stock, always of the same length, a plunger carried by the head and having cam means for moving the blank sideways from the position in which it is cut off, and a spring-pressed plunger in position to engage the top surface of the blank to hold it after it is so moved.

2. In a machine for making articles of sheet metal, the combination with a base and a head reciprocable toward and from the base, of a slide mounted on said base to move longitudinally, means carried by said head for moving the slide when the head moves away from the base, yieldingly mounted means on the base for supporting a strip blank of sheet metal, yielding means on the last-named means for holding the sheet metal in a definite position thereon, a stop against which the forward end of the blank strip will be arrested, a cutter carried by said head for cutting a blank from the end of the sheet stock, a plunger carried by the head and having cam means for moving the blank from the position in which it is cut off, sideways, a spring-pressed plunger in position to engage the top surface of the blank to hold it, and means carried by said slide for forcing the blank longitudinally into a third position.

3. In a machine for making an article from sheet metal, the combination with a fixed base and a reciprocatory head, of a slide movable longitudinally, said slide having an inclined surface thereon, a plunger carried by the head and having an inclined surface for engaging the first inclined surface when the plunger comes down and forcing the slide forward longitudinally, a transverse slide having a plate in position for engaging the top surface of the end of a stock, which becomes the blank when cut off, and holding it down, means on the head for operating the transverse slide to engage the blank and move it transversely out of the position in which it is cut off, and means carried by the first-named slide for moving the blank longitudinally.

4. In a machine for making an article from sheet metal, the combination with a fixed base and a reciprocatory head, of a slide mounted on said base and movable longitudinally, said slide having an inclined surface thereon, a plunger carried by the head and having an inclined surface for engaging the first inclined surface when the plunger comes down and forcing the slide forward longitudinally, yielding means always tending to move the slide back, an adjustable stop against which the slide is brought back by the spring, means for guiding the slide, a spring-supported plate on the base for carrying the stock, a cutting-off knife on the head adapted to engage the stock at the edge of the spring-supported plate to cut it off and to depress the plate when the stock is entirely separated from the blank left at the end thereof, a transverse slide having a plate in position for engaging the top surface of the end of a stock, which becomes the blank when cut off, and holding it down, means on the head for operating the transverse slide to engage the blank and move it transversely out of the position in which it is cut off, means carried by the first-named slide for moving the blank longitudinally when the head rises, and a die in position to receive the blank therefrom.

5. In a machine for making articles of sheet metal, the combination with a base and a head reciprocable toward and from the base, of a slide carried by the base, a plunger carried by the head, means on the plunger for moving the slide at each operation of the head, means on the base for guiding a strip piece of stock in a direction transverse to the direction of motion of the slide, a stop against which the stock is arrested, a cutter carried by the head for cutting off a blank at each reciprocation of the head, means on the slide for moving said blank laterally away from the strip of stock, means for moving the blank longitudinally, and a die into which the blank is pushed by the last-named means.

6. In a machine for making articles of sheet metal, the combination with a base and a head reciprocable toward and from the base, of a slide carried by the base, a plunger carried by the head, a cam on the plunger for moving the slide at each operation of the head, a cutter carried by the head for cutting off a blank from a strip of stock at each reciprocation of the head, means operated by the head for moving said blank laterally away from the sheet of stock, means carried by the slide for moving the blank longitudinally, a die into which the blank is pushed by the last-named action of the slide, said die having a space for receiving the blank, and a mandrel therein around which the blank is forced by the motion of the slide.

7. In a machine for making cylindrical articles of sheet metal, the combination with a base and a head reciprocable toward and from the base, of a slide mounted on said base to move longitudinally, means carried by said head for moving the slide, a cutter carried by said head for cutting a blank from the end of a sheet of metal always of the same length, a plunger carried by the head and having means for moving the blank from the position in which it is cut off, sideways, spring-pressed means in position to engage the top surface of the blank to hold it, a die located in longitudinal alignment with the second position of the blank, and means carried by said slide for forcing the blank into said die.

8. In a machine for making cylindrical articles from sheet metal, the combination with a fixed base and a reciprocatory head, of a slide mounted on said base and movable longitudinally, a plunger carried by the head and having means for forcing the slide forward longitudinally, yielding means tending to move the slide back, a cutting-off knife on the head adapted to engage the stock and cut it off, a transverse slide having a plate in position for engaging the top surface of the end of a stock, which becomes the blank when cut off and holding it down, means on the head for operating the transverse slide to engage the blank and move it transversely out of the position in which it is cut off, means carried by the first-named slide for then moving the blank longitudinally, and a die in position to receive the blank when moved by said first-named slide, said die comprising a cylindrical recess with its axis transverse to the direction of motion of the first-named slide, and a central cylindrical mandrel mounted in fixed position in the recess and spaced from it equally on all sides.

9. In a machine for making articles from sheet metal, the combination with a fixed base and a reciprocatory head, of a slide mounted on said base and movable longitudinally, a plunger carried by the head and having means for forcing the slide forward longitudinally, a cutting-off knife adapted to engage the stock and cut it off, means on the head to engage the blank and move it transversely out of the position in which it is cut off, means carried by the first named slide for then moving the blank longitudinally, and a die in position to receive the blank when moved by said first-named slide, said die comprising a recess with its axis transverse to the direction of motion of the first-named slide, and a central cylindrical mandrel mounted in fixed position in the recess and spaced from it equally on all sides.

10. In a machine for making cylindrical articles from sheet metal, the combination with a fixed base and a reciprocatory head, of a cutting-off knife adapted to engage the stock and cut it off, a transverse slide having a plate in position for engaging the top surface of the end of the stock, which becomes the blank when cut off, and holding it down, means on the head for operating the transverse slide to engage the blank and move it transversely out of the position in which it is cut off, means for then moving the blank longitudinally, and a die in position to receive the blank, said die comprising a cylindrical recess, and a central cylindrical mandrel mounted in fixed position in the recess and spaced from it equally on all sides.

11. In a machine of the character described, the combination of a base, a plate thereon, spring means on the base for supporting the plate from below and allowing it to yield, said plate having a recess open at one side for receiving a strip of sheet metal, a side register at the exposed edge of said sheet metal for engaging it and holding it in a definite position in the recess, a spring for constantly pressing the edge of the sheet metal strip inwardly to hold it in a predetermined position, a stop against which the end of the sheet metal is adapted to come, and a cutter arranged to come down against the end of the plate to depress the plate and cut off a blank from the end of the sheet metal.

12. In a machine of the character described, the combination of a plate having a recess open at one side for receiving a strip of sheet metal, a side register at the exposed edge of said plate for engaging the strip and holding it in a definite position in the recess, a rod connected with said side register, a spring thereon for constantly pressing the edge of the sheet metal strip inwardly to hold it in a predetermined position, a stop against which the end of the sheet metal is adapted to come, and a cutter arranged to operate against the strip to cut off a blank.

13. In a machine of the character described, the combination with a die and a mandrel extending through the die, of a sleeve slidable on the mandrel into and through the die, a slide to which the sleeve is fixed, a head movable transversely to the mandrel, a plunger on the head, a cam pivoted on the plunger, yielding means for forcing the cam into open position, said slide having two oppositely inclined surfaces meeting at a point, located in such position that, when the head moves toward the mandrel, the cam will be forced back by one surface and then will spring back under the other surface, whereby as the head moves away from the mandrel the cam will force the slide forward to eject an article from the die.

14. In a machine for making tubular articles of sheet metal, the combination of a die having a recess extending through it from one side to the other, a mandrel projecting through said recess in the center thereof, means for pushing a flat blank of sheet metal into said die between the mandrel and the inner surface of the recess and forcing the blank around the mandrel, a sleeve slidably mounted on the mandrel, means for moving the sleeve through the die to remove the article therefrom, an anvil in two parts, one part having a groove in position for receiving the bottom of the article when pushed out of the die and the other part having a registering groove adapted to come down on the first part and shape the article around the mandrel which extends over the first part of the anvil.

15. In a machine for making tubular articles of sheet metal, the combination of a die having a recess, a mandrel projecting through said recess, means for pushing a flat blank of sheet metal into said die between the mandrel and the inner surface of the recess and forcing the blank around the mandrel, means to remove the article therefrom, an anvil in two parts, and one part having a groove in position for receiving the bottom of the article when pushed out of the die and the other part having a registering groove adapted to come down on the first part and shape the article around the mandrel which extends over the first part of the anvil.

16. In a machine of the character described, the combination with a die and a mandrel extending through the die, of a sleeve slidable on the mandrel into and through the die, a slide to which the sleeve is fixed, a plunger movable transversely to the mandrel, a cam pivoted on the plunger, yielding means for forcing the cam into open position, said slide having an inclined surface located in such position that, when the head moves toward the mandrel, the cam will be forced back by said surface and then will spring back, whereby as the head moves away from the mandrel the cam will force the slide forward to eject an article from the die.

17. In a machine of the character described, the combination of a plate having a recess open at one side for receiving a strip of sheet metal, a side register at the exposed edge of said plate for engaging the strip and holding it in a definite position in the recess, a rod connected with said side register, and a spring thereon for constantly pressing the edge of the sheet metal strip inwardly to hold it in a predetermined position.

18. In a machine for making articles of sheet metal, the combination with a base and a head reciprocable toward and from the base, yieldingly mounted means on the base for supporting a strip blank of sheet metal, yielding means on the last-named means for holding the sheet metal in a definite position thereon, a plunger carried by the head and having means for moving the blank sideways from the position in which it is cut off, and a spring-pressed plunger in position to engage the top surface of the blank to hold it after it is so moved.

19. In a machine for making articles of sheet metal, the combination with a base and a head reciprocable toward and from the base, of a slide mounted on said base to move longitudinally, means carried by said head for moving the slide when the head moves away from the base, yieldingly mounted means on the base for supporting a strip blank of sheet metal, yielding means on the last-named means for holding the sheet metal in a definite position thereon, a plunger carried by the head and having means for moving the blank sideways, a spring-pressed plunger in position to engage the top surface of the blank to hold it, and means carried by said slide for forcing the blank longitudinally into a third position.

20. In a machine for making tubular articles of sheet metal, the combination of a die having a complete cylindrical recess, a mandrel projecting through and beyond said recess, means for pushing a flat blank of sheet metal into said die laterally between the mandrel and the inner surface of the recess and forcing the blank laterally around the mandrel, means to remove the article therefrom longitudinally, leaving it on the mandrel, an anvil in position for receiving the article when pushed out of the die, and means adapted to come down to shape the article around the mandrel.

In testimony whereof we have hereunto affixed our signatures.

ARVID S. JOHNSON.
HERBERT W. NEUNHERZ.